(12) United States Patent
DeRuijter et al.

(10) Patent No.: US 8,098,671 B1
(45) Date of Patent: Jan. 17, 2012

(54) MONITORING DATAGRAMS IN A DATA NETWORK

(75) Inventors: Denis DeRuijter, Harvard, MA (US); Steve Onishi, Groton, MA (US); Jerome P. Moisand, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1407 days.

(21) Appl. No.: 11/207,934

(22) Filed: Aug. 22, 2005

(51) Int. Cl.
H04L 12/28 (2006.01)

(52) U.S. Cl. .................................... 370/401; 455/512

(58) Field of Classification Search .............. 370/401, 370/356, 352, 229; 455/512
See application file for complete search history.

(56) References Cited

U.S. PATENT DOCUMENTS

| | | | |
|---|---|---|---|
| 6,714,544 B1* | 3/2004 | Bosloy et al. | 370/395.1 |
| 6,928,150 B2* | 8/2005 | Johnston | 379/114.01 |
| 2004/0213150 A1* | 10/2004 | Krause et al. | 370/229 |
| 2006/0034266 A1* | 2/2006 | Harris et al. | 370/356 |
| 2006/0171378 A1* | 8/2006 | Harris et al. | 370/352 |

OTHER PUBLICATIONS

Rosenberg et al., "Session Initiation Protocol (SIP): Locating SIP Servers", Jun. 2002, http://www.ietf.org/rfc/rfc3263.txt?number=3263, 14 pages.

Rosenberg et al., "SIP: Session Initiation Protocol", Jun. 2002, http://www.ietf.org/rfc/rfc3261.txt?number=3261, 221 pages.

W. Marshall, Ed., "Private Session Initiation Protocol (SIP) Extensions for Media Authorization", RFC 3313, Jan. 2003, 15 pages.

M. Handley et al., "SDP: Session Description Protocol", RFC 2327, Apr. 1998, 40 pages.

H. Schulzrinne et al., "RTP Profile for Audio and Video Conference with Minimal Control", RFC 3551, Jul. 2003, 42 pages.

J. Rosenberg et al., "An Offer/Answer Model with the Session Description Protocol (SDP)", RFC 3264, Jun. 2002, 24 pages.

* cited by examiner

*Primary Examiner* — Dang Ton
*Assistant Examiner* — Wei Zhao
(74) *Attorney, Agent, or Firm* — Harrity & Harrity, LLP

(57) ABSTRACT

A communication session over a network is facilitated. A signaling datagram from a source device having a source identity may be intercepted by a network device, and a response datagram may be generated for instructing the source device to send a subsequent datagram to the network device. The signaling datagram may be forwarded to a SIP server, where the SIP server associates the source identity with the network device acting on behalf of the source device, and where the SIP server operates to connect a destination device with the source device to establish a communication session over the network. The subsequent datagram may be received from the source device, and the subsequent datagram may be made available to the destination device via the network.

27 Claims, 4 Drawing Sheets

MONITORING DATAGRAMS IN A DATA NETWORK

FIELD OF THE INVENTION

Implementations consistent with the principles of the invention relate generally to communication networks and, more particularly, to negotiating media flows in data communication networks.

BACKGROUND OF THE INVENTION

Historically, voice-based telephone communications have been handled via dedicated networks, such as the public switched telephone network (PSTN), while data communications have been handled via dedicated packet networks, such as Internet protocol (IP) networks. A current trend is to converge these two types of networks, where telephone voice traffic and other forms of real-time media are converted into digital form and carried by a packet data network along with other forms of data. These converged networks may offer many advantages, such as lower operating costs as compared to maintaining separate voice and data networks, greater flexibility regarding service offerings to customers, such as multimedia conferencing, and more efficient use of network resources, such as network hardware and software.

Certain media types are more sensitive to network delays than others. For example, static data such as historical documents and/or still images accessed from a database may be insensitive to transmission delays. In contrast, real-time streaming video and Voice over Internet Protocol (VoIP) data may be very sensitive to transmission delays. Transmission delays may be caused by insufficient bandwidth in network links, signal losses in the transmission path, propagation delays, processing delays, and/or queuing delays. Proliferation of delay-sensitive services, such as VoIP, may require that service providers guarantee customers certain levels of service for delay-sensitive communication data. For example, a service provider may have to guarantee customers a certain bandwidth for performing, for example, VoIP, streaming media and/or video conferencing.

Service providers may use different techniques when trying to provide guaranteed levels of service to customers. For example, service providers may try to monitor data traffic on a network in order to identify delay-sensitive traffic, observe customer traffic as it passes through intermediate network devices, such as a router, and/or make predictions regarding the type of data traffic that will pass through an intermediate network device at a later time. This type of traffic prediction is referred to as a heuristic prediction because an informal, or rule of thumb, future estimate is made by observing a current pattern.

Employing heuristic prediction is computationally intensive because actual data traffic is being monitored and processed substantially on the fly. In addition, heuristic prediction may not be very adaptable and/or accurate because the data used to make future resource allocation decisions has already gone by the router, and subsequent data may not be of the same type and/or pattern as the data that has already traversed the router.

SUMMARY OF THE INVENTION

In accordance with one aspect of the invention, a network device operating in a network is provided. The network device may include an input interface to accept a first incoming datagram from a source device and an output interface to make a first outgoing datagram available to the network. The network device may include a processor operatively associated with the input interface and the output interface. The processor may be adapted to receive the first incoming datagram via the input interface. The processor may make the first outgoing datagram available to the output interface, where the first outgoing datagram causes the source device to send subsequent datagrams through the network device. The processor may forward information associated with the incoming datagram to a destination device with a second outgoing datagram, where the second outgoing datagram instructs the destination device to communicate with the network device acting on behalf of the source device.

In accordance with another aspect of the invention, a system for providing quality-of-service (QoS) based communication sessions on a network is provided. The system may include a network device that includes an input interface, an output interface, and a processor. The processor may be adapted to receive a registration datagram from a source device via the input interface and to send a redirection datagram to cause the source device to send a subsequent datagram to the network device. The processor may send registration information extracted from the registration datagram to a registrar via the output interface, where the registration datagram causes the registrar to direct a subsequent source device bound datagram to the network device acting on behalf of the source device. The processor may be adapted to receive the subsequent datagram from the input interface, where the subsequent datagram includes bearer data or signaling data. The processor may be adapted to monitor signaling data and to apply QoS to the bearer data.

In accordance with yet another aspect of the invention, a method for facilitating a communication session over a network performed by a network device is provided. The method may include intercepting a signaling datagram from a source device having a source identity, and generating a response datagram for instructing the source device to send a subsequent datagram to the network device. The method may include forwarding the signaling datagram to a Session Initiation Protocol (SIP) server, where the SIP server associates the source identity with the network device acting on behalf of the source device, and where the SIP server operates to connect a destination device with the source device to establish a communication session over the network. The method may include receiving the subsequent datagram from the source device, and making the subsequent datagram available to the destination device via the network.

In accordance with still another aspect of the invention, a device operating in a network to provide a communication session is provided. The device may include a means for intercepting a signaling datagram associated with a source device, where the signaling datagram includes a destination address and signaling information. The device may include a means for processing that may be adapted to receive the intercepted signaling datagram, to forward the signaling information to a destination device as the first outgoing datagram, to receive a reply from the destination device acknowledging receipt of the signaling information, and to substitute a source address associated with the destination device into a second outgoing datagram so that the source device interprets the second outgoing datagram as originating from the destination device instead of from the device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention may monitor signaling traffic associated with the setup of delay-sensitive communication sessions in a network and/or apply QoS to bearer traffic in the network.

Exemplary System

Figure 1:
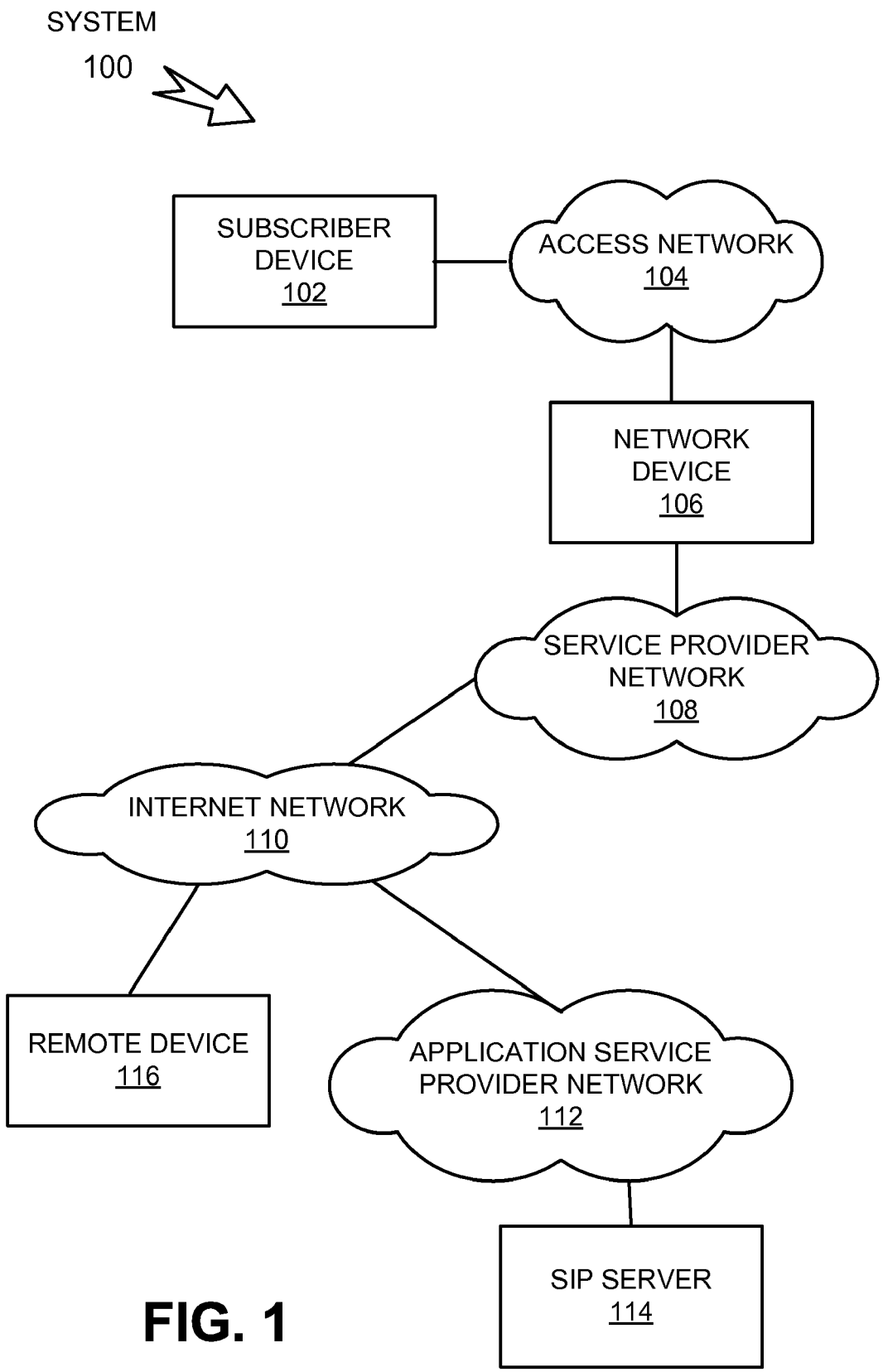
FIG. 1 illustrates an exemplary system in which systems and methods, consistent with the principles of the invention, may be implemented.

FIG. 1 illustrates an exemplary system in which systems and methods, consistent with the principles of the invention, may be implemented. As illustrated, system 100 may include a subscriber device 102, an access network 104, a network device 106, a service provider network 108, an Internet network 110, an application service provider network 112, a SIP server 114, and a remote device 116. The number of devices illustrated in FIG. 1 is provided for simplicity. In practice, a typical system could include more or fewer devices than illustrated in FIG. 1. In addition, devices depicted as single entities in FIG. 1 may be implemented in a distributed fashion.

Subscriber device 102 may include any device capable of placing datagrams on a network, such as access network 104. Subscriber device 102 may be a personal computer, a personal digital assistant (PDA), a web enabled cellular telephone, and/or another SIP capable device. A SIP device may include any client (e.g., a computer device, a web-appliance, etc.) that is configured to provide, for example, SIP telephone functions. Subscriber device 102 may operate as a SIP User Agent when participating in SIP compliant communication sessions. A SIP User Agent may be any device serving as a signaling endpoint in a SIP-based communication session. For example, a calling device and/or a called device may be SIP User Agents. Subscriber device 102 may subscribe to one or more services offered by, for example, access network 104, service provider network 108, and/or application service provider network 112.

Access network 104 may include any type of network capable of receiving a datagram. Datagram, as used herein, refers to any type of machine-readable data unit having substantially any format (e.g., bit, byte, chunk, packet, etc.) and capable of transmission in a network. A datagram may include, for instance, packet-based data and/or another unit of data, such as nonpacket-based data. Access network 104 may provide subscriber device 102 with connectivity to network resources. For example, subscriber device 102 may be operated by a residential user to gain access to service provider network 108 via a link and network device 106. A link may include a broadband connection such as a digital subscriber line (DSL) connection provided over, for example, shielded twisted pair, a cable modem connection provided over, for example, coaxial cable and/or optical fiber, and/or a wireless connection provided over, for example, a wireless fidelity (Wi-Fi) link and/or free-space optical link.

Network device 106 may include any type of device capable of receiving a datagram from a source and/or forwarding a datagram to a destination. Network device 106 may include an edge device, such as a service edge router, operating at an edge of a network, such as service provider network 108. For example, network device 106 may operate as an edge device between a high speed network and a low speed network. In such an implementation, network device 106 may be configured to apply QoS monitoring, traffic engineering, policy routing and/or lawful intercept. Network device 106 may receive datagrams from subscriber device 102 via an input port and forward the datagrams to a destination using, for example, an output port. For example, network device 106 may determine a destination address associated with a received datagram. The destination address may be used for forwarding the datagram to a destination device, such as remote device 116.

Network device 106 may provide datagram filtering by forwarding a subset of received datagrams toward a destination. For example, network device 106 may include firewall functionality whereby incoming datagrams are examined for the presence of certain conditions, such as malicious code and/or unknown source addresses associated with a sender of the datagram. Network device 106 may be configured so as to not forward datagrams containing these conditions. Network device 106 may operate on datagrams associated with signaling traffic and/or datagrams associated with bearer traffic. Signaling traffic, as used herein, may refer to one or more datagrams associated with registration or facilitating, negotiating, establishing, and/or terminating one or more parameters associated with a communication session. In contrast, bearer traffic, as used herein, may refer to one or more datagrams used to carry data associated with a communication session. Signaling datagrams and/or bearer datagrams may include a header portion and/or a payload portion. A header portion may include information for use in routing a datagram and/or information identifying the datagram. A payload portion may include application data, such as data associated with an application offered by an application service provider. Application data may include instructions for causing a SIP User Agent to perform an action.

Service provider network 108 may include any network capable of receiving a datagram. Service provider network 108 may include one or more network devices cooperatively operating to receive, send, and/or transport a datagram. For example, service provider network 108 may include network device 106, a network switch, a firewall, a database, a gateway, and/or a network controller. Service provider network 108 may be operated by, for example, a telecommunications provider, a cable television company, or a multi-media firm. Service provider network 108 may operate to communicatively couple subscriber device 102 and/or access network 104 to a public network, such as the Internet, and/or a private network, such as a corporate LAN. For example, service provider network 108 may be implemented as a local area network (LAN) servicing a residential community, such as a neighborhood. A residential user residing in the neighborhood may operate subscriber device 102 to access Internet network 110 via access network 104 and/or service provider network 108. The residential user may subscribe to network access services via a service provider associated with service provider network 108 on, for example, a monthly basis. Service provider network 108 may provide a subscriber device 102 operating within the neighborhood with a network identifier such as an IP address, a universal resource identifier (URI), etc., for use in identifying subscriber device 102 to other networked devices. Internet network 110 may include any network capable of receiving a datagram. Internet network 110 may include a public network such as the Internet. Internet network 110 may include LANs, metropolitan area networks (MANs), and/or wide area networks (WANs). Internet network 110 may include one or more network devices and/or systems cooperatively operating to receive, send, and/or transport a datagram. For example, Internet network 110 may include routers, network switches, firewalls, databases, gateways, servers, network operations centers (NOCs), etc.

Application service provider network 112 may include any network capable of receiving a datagram. Application service provider network 112 may operate to make an application available to devices operating on access network 104, service provider network 108 and/or Internet network 110. For example, application service provider network 112 may operate to provide a VoIP service for allowing subscriber device 102, located in a first geographic region, to voice communicate with remote device 116 that may be located in the first geographic region and/or may be located in a second geographic region without incurring long distance telephone charges. Application service provider network 112 may make other applications available to subscriber device 102 and/or remote device 116, such as multimedia services including collaborative video conferencing, streaming media services including high definition television (HDTV) programming, and/or data communication services including secure data transport.

Application service provider network 112 may provide multiple service levels to users based on for example, network domains associated with subscription levels. For example, assume that a first user has an address of sip:user1@asp.com and that this address lets the user access a standard level of service providing voice-only calling. Assume that a second user may have an address of sip:user2@premium.asp.com that lets the user access enhanced services including voice-only calling, voice and video-calling, and streaming media downloads. Application service provider network 112 may operate both domains in order to provide varying service levels to subscribers based on, for example, monthly subscription fees. Application service provider network 112 may include one or more network devices and/or systems cooperatively operating to receive, send, and/or transport a datagram. For example, application service provider network 112 may include devices, such as, routers, network switches, firewalls, databases, gateways, servers, etc.

SIP server 114 may include any device capable of facilitating the exchange of SIP-based signaling. SIP server 114, for example, may operate as a SIP registrar, a SIP proxy server, and/or a SIP redirect server to facilitate SIP calls. As described in Internet Engineering Task Force (IETF) document RFC 2543 and its successors (RFC 3261 et al.), SIP server 114 may operate as both a server and/or a client for the purpose of making requests on behalf of other clients. Requests are serviced internally or by passing them on, possibly after processing, to other servers. SIP server 114 may interpret, and, if necessary, modify a request message before forwarding it.

SIP server 114 may include location server functionality. A location server may include a device that serves as a repository for end user information to enable, for example, address validation, feature status, and real-time subscriber feature configuration. Additionally, a location server may store system configuration information and user location information for determining the latest known location information pertaining to a particular user. SIP server 114 may maintain a registration database for associating a device identifier, such as a universal resource identifier (URI) with the SIP User Agent. SIP server 114 may facilitate calls by receiving a datagram from a calling party and routing the datagram to a SIP User Agent associated with a URI in the database.

Remote device 116 may include any device capable of communicating through the use of signaling, such as SIP signaling. Remote device 116 may include any client (e.g., a computer device, a web-appliance, etc.) that is configured to provide, for example, SIP telephone functions. Remote device 116 may, for example, take the form of standalone devices such as a dedicated SIP telephone device resembling a plain old telephone system (POTS) handset. Remote device 116 may also include a software client that may run, for example, on a conventional personal computer (PC), a laptop computer, and/or a media gateway.

Although implementations consistent with the principles of the invention are described below in the context of SIP and an Internet Protocol (IP)-based network, one of ordinary skill in the art will recognize that the present invention may be generally applicable to other equivalent or analogous communication protocols and/or types of transport networks. The SIP protocol is described in IETF document RFC 2543 and its successors (RFC 3261 et al.). Various architectures have been proposed in conjunction with these protocols with a common theme of having an address resolution function (e.g., SIP server 114) somewhere in the network to control features on behalf of users and to maintain current information on how to reach any destination party.

It should be understood throughout this disclosure that, although SIP-type messages are shown for convenience, any type of protocol or mixture of protocols may be applied in various parts of the overall system. In particular, signaling messages and responses between subscriber device 102, network device 106, SIP server 114 and remote device 116 may strictly or loosely conform to SIP or some other standardized protocol, and/or may be proprietary in nature.

Access network 104, service provider network 108, Internet network 110 and application service provider network 112 (collectively, "the networks") may include one or more data networks operating via substantially any networking and/or signaling protocol, such as asynchronous transfer mode (ATM), synchronous optical transport (SONET), Internet Protocol (IP), Bluetooth, SIP, Real Time Streaming Protocol (RTSP), Real-time Transport Protocol (RTP), H.323, and Media Gateway Control Protocol (MGCP). The networks may include hardwired connections, such as shielded twisted pairs, coaxial cables, optical fibers, and/or waveguides. Alternatively, the networks may include wireless links, such as free space optical links, and/or free space acoustic links.

Exemplary Architecture

Figure 2:
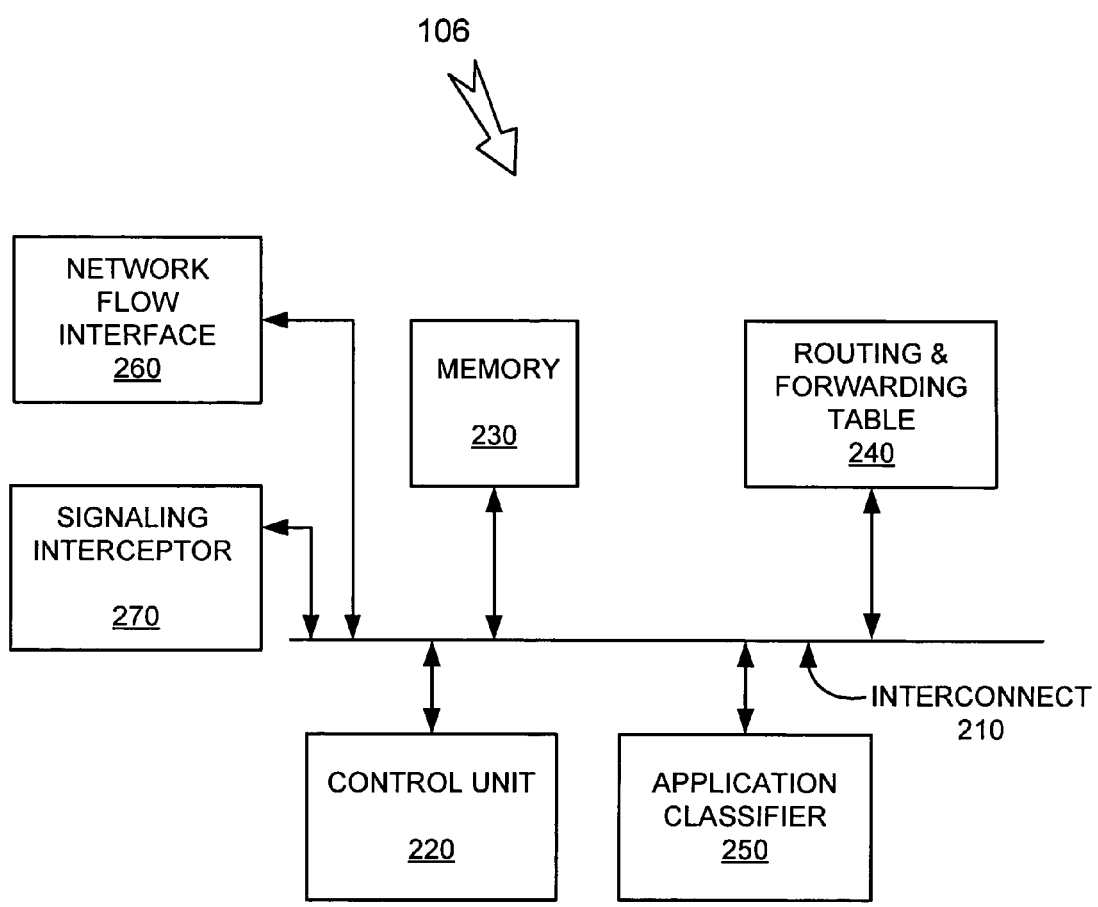
FIG. 2 illustrates an exemplary configuration of a network device in an implementation consistent with the principles of the invention.

FIG. 2 illustrates an exemplary configuration of a network device in an implementation consistent with the principles of the invention. It will be appreciated that SIP server 114 and remote device 116, as well as other network devices, such as firewalls, gateways, routers, servers, switches, etc., may be similarly configured. As illustrated, network device 106 may include an interconnect 210, a control unit 220, a memory 230, a routing and forwarding table 240, an application classifier 250, a network flow interface 260 and a signaling interceptor 270. Interconnect 210 may include one or more communication paths that permit communication among the components of network device 106.

Control unit 220 may include any type of processor or microprocessor, and may interpret and execute instructions. Control unit 220 may be implemented in a standalone configuration and/or in a distributed configuration, such as in a parallel processing implementation. Memory 230 may include a random access memory (RAM) or another type of dynamic storage device that stores information and instructions for execution by control unit 220. Memory 230 may also be used to store temporary variables or other intermediate information during execution of instructions by control unit 220. Memory 230 may be used for storing information, such as quality-of-service (QoS) policies, for use in establishing delay-sensitive communication sessions. Memory 230 may operate in cooperation with data storage devices, such as a magnetic disk or optical disk and its corresponding drive and/or some other type of magnetic or optical recording medium and its corresponding drive for storing information and/or instructions.

Routing and forwarding table 240 may include hardware and/or software for storing and retrieving information used for routing and/or switching an incoming datagram toward a destination. For example, routing and forwarding table 240 may include addresses associated with next-hop routers, switches, and/or other network devices that are operatively associated with network device 106 and that can be used to facilitate forwarding a datagram toward a destination.

Application classifier 250 may include hardware and/or software for implementing a rule set that may be used for making decisions about signaling traffic traversing network device 106. Application classifier 250 may inspect traffic as the traffic passes through network device 106 and the rule set may be used to identify traffic of interest. Traffic of interest may be processed by applying policies thereto. For example, application classifier 250 may identify traffic of interest associated with controlling and performing traffic classification, packet queuing, rate-limiting operations, managing quality of service (QoS), and/or management operations for network services provided by, for example, an application service provider. For example, application classifier 250 may determine that a source device and destination device desire to participate in a VOID communication session. Application classifier 250 may facilitate the application of one or more constraints to traffic, such as signaling traffic and/or bearer traffic, passing through network device 106. A predetermined threshold may be set so that participants in the communication session may not perceive noticeable delays and/or signal distortion when delays remain at or below the threshold.

Network flow interface 260 may include hardware and/or software for monitoring and/or identifying bearer traffic traversing network device 106. Network flow interface 260 may operate on network flow related information, such as a source address, destination address, source port, destination port, protocol and/or other information. Network flow interface 260 may be associated with forwarding bearer traffic toward a destination. For example, network flow interface 260 may receive bearer traffic associated with a VoIP session, a file transport protocol (FTP) session, an RTP session and/or a hypertext transport protocol (HTTP) session. Network flow interface 260 may examine a destination address associated with a bearer datagram and forward the datagram toward a destination based on the address.

Signaling interceptor 270 may include hardware and/or software for intercepting, monitoring and/or processing signaling communications traversing network device 106. For example, network device 106 may receive upstream signaling communications from subscriber device 102 and/or access network 104. Network device 106 may receive downstream signaling communications from service provider network 108, Internet network 110, and/or application service provider network 112. Network device 106 may transparently intercept one or more signaling protocols from upstream and/or downstream signaling flows. Implementations may combine the functionality of network flow interface 260 and/or signaling interceptor 270 into a single device and/or component operating in conjunction with network device 106.

Signaling interceptor 270 may be operatively coupled to application classifier 250. Signaling interceptor 270 may provide signaling information to application classifier 250 for use in generating, modifying, and/or implementing rule sets and/or communication policies. Signaling interceptor 270 may include a mechanism, such as a content addressable memory (CAM), for identifying particular datagrams received at network device 106. Once a datagram is identified, the datagram may be extracted and/or processed by network device 106. Signaling interceptor 270 may operate with software, such as a SIP protocol stack, for parsing the content of SIP signaling flows.

Network device 106 may implement the functions described below in response to control unit 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Returning to FIG. 1, subscriber device 102 and remote device 116 may utilize signaling, such as SIP, to facilitate a communication session. SIP is a signaling protocol that allows two end points, such as subscriber device 102 and remote device 116, to locate each other on a network. SIP may also allow the two end points to negotiate with each other regarding establishing a communication session. Once the two end points have completed a negotiation, they may commence a communication session using one or more other network protocols, such as protocols to facilitate VoIP communication. For example, SIP may operate as a control protocol for initiating, changing, managing and/or terminating voice, video, and/or other types of multimedia sessions across a network. SIP may support and/or enable, for example, name translation and/or user location identification to ensure that a call reaches a called party, feature negotiation for allowing devices participating in a call to use call features supported by devices associated with the calling session, call participant management for bringing parties into a call and/or for dropping parties from a call, and/or call feature changes for allowing a caller to change call features during a calling session.

SIP signaling datagrams may carry a session description protocol (SDP) for defining attributes of media flows associated with a calling session. For example, SDP may include a short structured textual description of the name and purpose of a session, and the media, protocols, codec formats, timing and transport information that are used to decide whether a session is likely to be of interest to a party. SIP-based exchanges may follow an offer and acceptance model whereby a caller makes an offer to a called party to participate in a calling session having certain parameters, and the called party answers with an acceptance of a subset of the parameters. The called party may also answer with a suggested set of alternative parameters for use in conjunction with the calling session.

A SIP User Agent, such as subscriber device 102, may register its identity with a device associated with a network before participating in SIP calling sessions. Subscriber device 102 may register, for example, with SIP server 114. Registration may serve to make the identity of subscriber device 102 known to other devices on a network. For example, subscriber device 102 may send identity information to SIP server 114. The identity information may provide SIP server 114 with a way to contact subscriber device 102. When other devices wish to communicate with subscriber device 102, they may contact SIP server 114 to obtain information for contacting subscriber device 102.

For example, subscriber device 102 may register with SIP server 114 using an address-of-record that may be a universal resource identifier (URI). A URI may operate as an address uniquely identifying a user of subscriber device 102 on the network. A URI may be associated with a domain on the network and may have a format like sip: subscriber_device@domain where "SIP" indicates that the URI is a SIP URI, "subscriber_device" identifies a user of subscriber device 102, and "domain" indicates the network domain with which subscriber device 102 is associated. SIP server 114 may maintain a database associating sip: subscriber_device@domain with one or more locations where the user can be reached, such as subscriber device 102. For example, if subscriber device 102 is a mobile SIP phone, the device may be associated with different geographic areas and/or access networks at different times and/or a single user may operate multiple SIP devices at a time. Implementations may allow the user to be reached via substantially any number of SIP devices at substantially any time. A caller trying to reach subscriber device 102 may require dynamically updated information to reliably reach subscriber device 102. SIP server 114 may provide dynamically updated contact information for subscriber device 102 and/or other SIP devices operating on a network.

Network device 106 may operate to intercept signaling traffic and/or bearer traffic. For example, network device 106 may intercept signaling traffic so that network device 106 can insert itself into a signaling path associated with subscriber device 102. When network device 106 is inserted into the signaling path, network device 106 may participate in signaling and/or bearer sessions. For example, network device 106 may receive a REGISTER request from subscriber device 102 and forward the request to SIP server 114. An identity and/or contact information associated with the source may be registered with SIP server 114 via the REGISTER request. The REGISTER request may effectively provide other devices on the network with information that can be used to contact the source. Network device 106 may provide SIP server 114 with its URI (network device 106 URI) and inform SIP server 114 to associate a subscriber device 102 URI with network device 106 URI so that network device 106 can monitor signaling and/or bearer traffic going to/from subscriber device 102 as initiated by a device, such as a SIP User Agent. If destination device 116 initiates, renegotiates, and/or terminates a call to source device 102, signaling and/or bearer traffic may be sent to network device 106 before being passed along to source device 102. The above implementation may operate alone and/or in conjunction with other SIP signaling message modifications to facilitate keeping network device 106 in the signaling path for all or substantially all traffic that is sent from and/or to source device 102.

It may be desirable to have network device 106 participate in the signaling path to monitor call setup and/or tear down messages. Network device 106 may facilitate efficient use of connections, such as high bandwidth links suitable for conveying delay-sensitive data, via prompt notification of call setups and/or tear downs. For example, network device 106 may make a high quality connection available to a subsequent calling party upon receipt of a tear down message associated with an existing VoIP call. If high quality connections are of limited supply, an application service provider and/or service provider may realize more efficient use of network resources by promptly tearing down unnecessary calls. Network device 106 may efficiently track call states by tracking signaling and/or bearer traffic. For example, assume that subscriber device 102 and remote device 116 are involved in a VoIP calling session. Subscriber device 102 may desire to start a video connection to augment a voice only call presently taking place. Network device 106 may intercept signaling traffic associated with setup of the video portion and promptly allocate sufficient bandwidth to the video session to facilitate a substantially distortion-free video connection.

When subscriber device 102 wishes to communicate with remote device 116, subscriber device 102 may send an invitation to remote device 116 as, for example, an INVITE request. The INVITE request may pass through one or more intermediate proxies, such as other servers on Internet network 110, before reaching remote device 116. Remote device 116 may send a response in the form of a 200 OK request via the same route over which the INVITE request was received. Subscriber device 102 may respond with an acknowledgement (ACK) response sent directly to remote device 116 since subscriber device 102 knows where remote device 116 is located based on information included in the 200 OK response. Network device 106 may monitor the above signaling and/or bearer traffic associated with subscriber device 102 when inserted into the signaling and/or data path. Network device 106 may operate in an explicit proxy mode and/or transparent proxy mode when intercepting traffic associated with subscriber device 102.

Operation as an explicit proxy may require that SIP User Agents, such as subscriber device 102, be configured to point to network device 106 as an outbound proxy. When network device 106 is configured as an outbound proxy, subscriber device 102 may send outbound traffic directly to network device 106. Network device 106 may replace registration information associated with subscriber device 102 with its own registration information. A call intended for subscriber device 102 may be directed to network device 106 for forwarding to subscriber device 102. Network device 106 may support several networking protocols in an explicit proxy implementation, such as User Datagram Protocol (UDP), Transmission Control Protocol (TCP) and/or Transport Layer Security (TLS). Explicit proxy implementations may require that SIP User Agents be modified and/or updated using, for example, software so that data is sent to network device 106 instead of to another proxy device, such as SIP server 114. SIP User Agents may require periodic software updates and/or upgrades to implement new functionally when operating in an explicit proxy implementation.

In contrast, transparent proxy implementations may offer an advantage since transparent proxy implementations typically do not require software and/or other changes of SIP User Agents operating on a network. Network device 106 may monitor data traffic directed to, for example, SIP server 114. When network device 106 intercepts a SIP datagram, network device 106 may tell the SIP User Agent and/or the intended proxy that subsequent signaling traffic and/or bearer traffic should be directed to network device 106. Network device 106 may communicate with SIP User Agents and/or proxy devices using compliant SIP messages, thus avoiding software and/or hardware modifications on SIP User Agents and/or proxy devices.

Network device 106 may forward signaling and/or bearer traffic from a source to a destination and/or to an intermediate network device en route to a destination. For example, network device 106 may utilize a Record-Route header, Path header, and/or other techniques useful for causing subscriber device 102 and/or remote device 116 to send signaling traffic through network device 106 instead of passing signaling traffic directly between each other.

Network device 106 may operate to terminate media flows via signaling using, for example, a BYE message. Media flows may be terminated to free up resources that may have been allocated as a result of applying QoS, traffic engineering, policy management, and/or lawful intercept.

Exemplary Signaling

Figure 3:
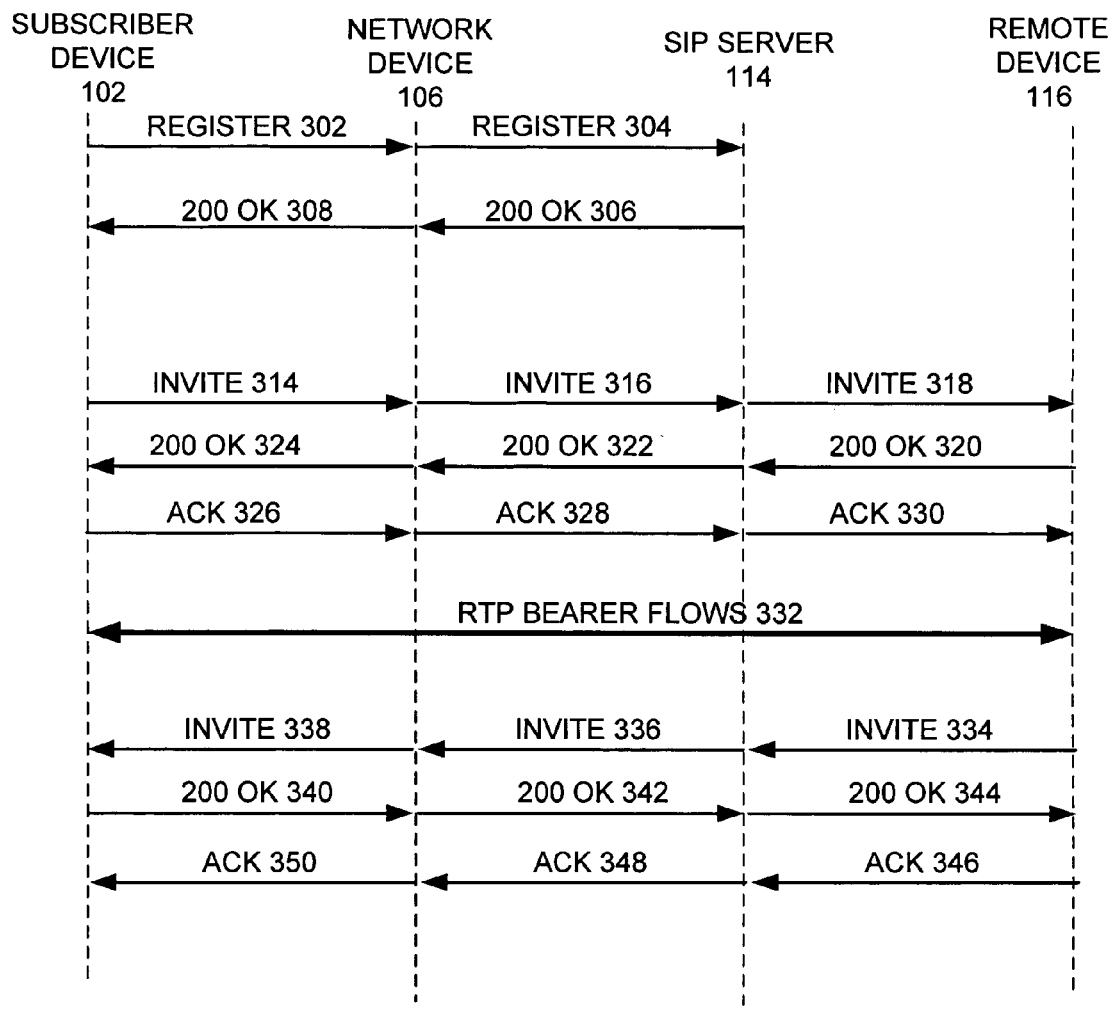
FIG. 3 illustrates exemplary signaling that may be used for implementing an explicit proxy implementation consistent with the principles of the invention.

FIG. 3 illustrates exemplary signaling that may be used for implementing an explicit proxy implementation consistent with the principles of the invention. The implementation of FIG. 3 may include subscriber device 102, network device 106, SIP server 114 and remote device 116. Subscriber device 102 may send a REGISTER request 302 to network device 106 to establish its identity and/or location. Network device 106 may be configured as an outbound proxy. Subscriber device 102 may be adapted to send REGISTER request 302 to network device 106 instead of another proxy device, such as SIP server 114. Network device 106 may send a REGISTER request 304 to SIP server 114 on behalf of subscriber device 102. Network device 106 may forward REGISTER request 302 received from subscriber device 102, or network device 106 may create a new REGISTER request that may include information contained in REGISTER request 302. SIP server 114 may send a 200 OK response 306 to network device 106 after receiving REGISTER request 304. 200 OK response 306 may indicate that REGISTER request 304 was successfully received and acknowledged. Network device 106 may receive 200 OK response 306 from SIP server 114 indicating that REGISTER request 304 was received and acknowledged, and network device 106 may send a 200 OK response 308 to subscriber device 102 indicating that REGISTER request 302 was successfully received and acknowledged.

Subscriber device 102 may send an INVITE request 314 to network device 106. INVITE request 314 may be configured to inform remote device 116 that it is being invited to join a communication session. INVITE request 314 may also include an SDP for providing remote device 116 with information about the session and/or instructions for joining the session. For example, the SDP may include information for informing remote device 116 how to start media application flows required to participate in the calling session. INVITE request 314 may also indicate the type of media that subscriber device 102 is able to send and/or receive and/or possibly the media that the calling party's telephone device is willing to send.

Network device 106 may send INVITE request 316 to SIP server 114. INVITE request 316 may include a forwarded version of INVITE request 314 and/or may be a new request. SIP server 114 may send INVITE request 318 to remote device 116. INVITE request 318 may include a forwarded version of INVITE request 314 and/or INVITE request 318 and/or may be a new request.

Remote device 116 may send a 200 OK response 320 to SIP server 114 in response to receiving INVITE request 318. 200 OK response 320 may indicate that INVITE request 318 was successfully received and acknowledged. SIP server 114 may relay a 200 OK response 322 to network device 106 indicating that INVITE request 316 was successfully received and acknowledged by SIP server 114. Network device 106 may relay a 200 OK response 324 to subscriber device 102 indicating that INVITE request 314 was successfully received and acknowledged by network device 106. ACK response 326 may be sent from subscriber device 102 to network device 106 to indicate that 200 OK response 324 was successfully received and acknowledged. ACK response 328 may be sent from network device 106 to SIP server 114 and ACK response 330 may be sent from SIP server 114 to remote device 116 to indicate that 200 OK response 322 and 200 OK response 320 were successfully received and acknowledged, respectively.

RTP bearer flows 332 may be established, modified, and/or terminated between subscriber device 102 and network device 106 after the SIP exchange described above. RTP bearer flows 332 may include data for carrying on, for example, a VoIP communication session. During the communication session, remote device 116 may send an INVITE request 334 to SIP server 114 for inviting subscriber device 102 to join a session. For example, a VoIP communication session may be occurring between remote device 116 and subscriber device 102. During the session, remote device 116 may desire that a video link be used to augment the voice only information exchange taking place. Remote device 116 may use INVITE request 334 to initiate the video portion of the session. SIP server 114 may send INVITE request 336 to network device 106 and network device 106 may send INVITE request 338 to subscriber device 102. Subscriber device 102 may send a 200 OK response 340 to network device 106 indicating that INVITE request 338 was received and acknowledged. Network device 106 may send 200 OK response 342 to SIP server 114, and SIP server 114 may send 200 OK response 344 to remote device 116. ACK response 346 may be sent from remote device 116 to SIP server 114 to acknowledge receipt of 200 OK response 344. SIP server 114 may send ACK response 348 to network device 106 to acknowledge receipt of 200 OK response 342. Network device 106 may send ACK response 350 to subscriber device 102 to indicate that 200 OK response 340 was successfully received. Remote device 116 and subscriber device 102 may add, for example, a real-time video session to the VoIP session when remote device 116 receives ACK response 350.

Figure 4:
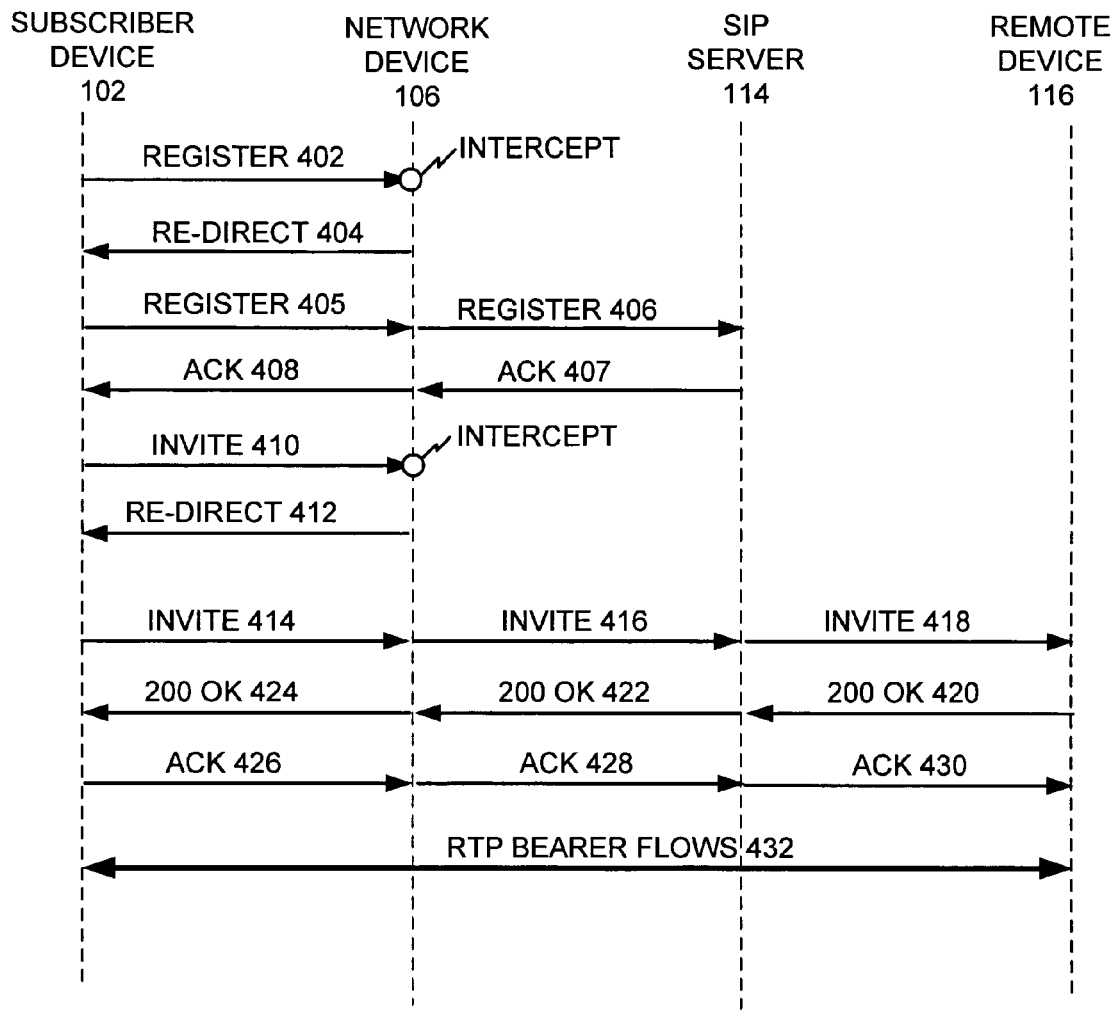
FIG. 4 illustrates exemplary signaling that may be used for implementing a transparent proxy implementation consistent with the principles of the invention.

FIG. 4. illustrates exemplary signaling that may be used for implementing a transparent proxy implementation consistent with the principles of the invention. In a transparent proxy implementation, network device 106 may intercept signaling and/or bearer traffic intended for another device on the network, such as SIP server 114.

Subscriber device 102 may direct a REGISTER request 402 to SIP server 114. REGISTER request 402 may pass through network device 106 where the request is intercepted. Network device 106 may send a RE-DIRECT response 404 (a SIP 3xx Redirection response) to subscriber device 102. RE-DIRECT response 404 may include a re-direction instruction to cause subsequent SIP REGISTER requests to be directed to network device 106 instead of SIP server 114.

Subscriber device 102 may respond to RE-DIRECT response 404 by sending a REGISTER request 405 to network device 106. Network device 106 may pass REGISTER request 405 on to SIP server 114 as REGISTER request 406. REGISTER request 406 may include a modified SIP register request. ACK response 407 may be sent from SIP server 114 to network device 106 to acknowledge receipt of REGISTER request 406. ACK response 408 may be sent from network device 106 to subscriber device 102 to acknowledge receipt of REGISTER request 405.

After registering with SIP server 114 via network device 106, subscriber device 102 may initiate a communication session with a destination, such as remote device 116, by sending INVITE request 410. Network device 106 may intercept INVITE request 410 and respond with RE-DIRECT response 412 that may include an instruction to cause subscriber device 102 to send invitations to network device 106.

Subscriber device 102 may respond to RE-DIRECT response 412 by sending INVITE request 414 to network device 106. INVITE request 414 may include an SDP for providing remote device 116 with information about the communication session being established and/or for joining the session. For example, the SDP may include information that informs remote device 116 how to start media flows used to participate in the calling session. Network device 106 may forward INVITE request 414 to SIP server 114 as INVITE request 416. SIP server 114 may in turn forward the content of INVITE request 414 to remote device 116 as INVITE request 418.

Remote device 116 may respond to INVITE request 418 with a 200 OK response 420 to acknowledge receipt of the request. SIP server 114 may forward the content of 200 OK response 420 to network device 106 as 200 OK response 422. Network device 106 may forward the content of 200 OK response 420 to subscriber device 102 as 200 OK response 424. Subscriber device 102 may send ACK response 426 to network device 106 to acknowledge receipt of 200 OK response 424. Network device 106 may send ACK response 428 to SIP server 114 to acknowledge receipt of 200 OK response 422. SIP server 114 may send ACK response 430 to remote device 116 to acknowledge receipt of 200 OK response 420.

Subscriber device 102 and remote device 116 may participate in a communication session using, for example, RTP bearer flows 432. Network device 106 may remain in the communication path between subscriber device 102 and remote device 116. For example, network device 106 may condition bearer traffic while remaining in the communication path.

Remote device 116 may attempt to establish a communication session with subscriber device 102 using, for example, an INVITE request directed to SIP server 114. When SIP server 114 receives the INVITE request from remote device 116, a database query may be made to identify a network device to receive the INVITE request on behalf of subscriber device 102. SIP server 114 may determine that network device 106 should receive the INVITE request for forwarding to subscriber device 102. When network device 106 receives the INVITE request from SIP server 114, the INVITE request is forwarded to subscriber device 102. Responses from subscriber device 102 may be directed through network device 106 so that it can monitor communication sessions associated with subscriber device 102 and/or remote device 116.

Implementations may employ one or more network devices, such as network device 106A and 106B, operating on substantially parallel paths in a network. For example, network device 106A may be configured to pass signaling traffic associated with subscriber device 102 while network device 106B may be configured to pass at least a portion of bearer traffic associated with subscriber device 102. Network device 106A may be configured so that signaling traffic and bearer traffic pass therethrough so that network device 106A can monitor and/or control all traffic associated with subscriber device 102.

Implementations may also employ network device 106 operating as, for example, a router, a switch, a SIP proxy, a SIP application layer gateway (ALG), and/or a SIP back-to-back user agent (B2BUA). In a B2BUA implementation, network device 106 may be configured to terminate a message flow received from subscriber device 102 and to create a new message flow intended for a destination, such as SIP server 114.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of signaling flows have been described with respect to FIGS. 3 and 4, the order of the signal flows and/or acts may be varied in other implementations consistent with the invention. Moreover, non-dependent signaling flows and/or acts may be implemented in parallel.

No element, act, instruction, or signal flow used in the description of the application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A network device operating in a network, the network device comprising:
    an input interface to accept an incoming datagram from a source device and intended for a destination device;
    an output interface to make a first outgoing datagram available to the network;
    a processor operatively associated with the input interface and the output interface, the processor to:
    intercept the incoming datagram via the input interface when the incoming datagram is addressed to the destination device,
    provide the first outgoing datagram to the output interface, the first outgoing datagram causing the source device to send one or more subsequent datagrams to the network device, where the network device comprises one of an application layer gateway (ALG), a Session Initiation Protocol (SIP) proxy, or a SIP back-to-back user agent (B2BUA), and
    forward information associated with the incoming datagram to the destination device via a second outgoing datagram, the second outgoing datagram instructing the destination device to communicate with the network device that acts on behalf of the source device.

2. The network device of claim 1, where the incoming datagram comprises one of a Session Initiation Protocol (SIP) REGISTER request or a SIP INVITE request.

3. The network device of claim 1, where the first outgoing datagram comprises a Session Initiation Protocol (SIP) RE-DIRECT response.

4. The network device of claim 1, where the source device comprises a Session Initiation Protocol (SIP) calling device and the destination device comprises a SIP server.

5. The network device of claim 4, where the SIP server is associated with an application service provider.

6. The network device of claim 1, where the information associated with the incoming datagram comprises registration information for registering the source device with the destination device.

7. The network device of claim 1, where each of the one or more subsequent datagrams comprises at least one of a bearer datagram or a signaling datagram.

8. The network device of claim 7, where the bearer datagrams are associated with at least one of a voice-over-Internet Protocol (VoIP) communication session, a video communication session, a multimedia communication session, a data communication session, or a still image communication session.

9. The network device of claim 7, where the bearer datagrams are associated with bearer traffic that is conditioned to provide at least one of quality-of-service (QoS), traffic engineering, policy routing, or lawful intercept functions.

10. The network device of claim 7, where the processor is further to:
monitor the bearer datagrams, and
condition bearer traffic based on the monitored bearer datagrams.

11. The network device of claim 1, where the processor is further to:
perform at least one of a quality of service (QoS) function, a traffic engineering function, a policy routing function, or a lawful intercept function on the one or more subsequent datagrams.

12. The network device of claim 1, where the processor is further to:
communicate with a memory that stores information associated with at least one of the incoming datagram, the first outgoing datagram, the one or more subsequent datagrams, and the second outgoing datagram.

13. A system for providing quality-of-service (QoS) based communication sessions on a network, the system comprising:
a network device, comprising at least one of an application layer gateway (ALG), a Session Initiation Protocol (SIP) proxy, or a SIP back-to-back user agent (B2BUA), the network device further comprising:
an input interface,
an output interface, and
a processor to:
intercept a registration datagram from a source device via the input interface,
send a redirection datagram to cause the source device to direct a subsequent datagram to the network device,
send registration information extracted from the registration datagram to a registrar via the output interface, the registration datagram causing the registrar to send a subsequent datagram, intended for the source device, to the network device that acts on behalf of the source device,
receive the subsequent datagram from the input interface, where the subsequent datagram includes one of bearer data or signaling data,
monitor the signaling data when the subsequent datagram includes the signaling data, and
apply QoS to the bearer data when the subsequent datagram includes the bearer data.

14. The system of claim 13, where the source device comprises a Session Initiation Protocol (SIP) device and the registrar comprises a SIP registrar.

15. The system of claim 13, where the network device is associated with one or more of an access network, a service provider network, an Internet network, an application service provider network, or a local area network.

16. The system of claim 13, where the source device is associated with at least one of a broadband connection, a digital subscriber line (DSL) connection, a plain old telephone system (POTS) connection, a fiber optic connection, or a wireless connection.

17. The system of claim 13, where the processor is further to:
perform at least one of quality of service (QoS), traffic engineering, policy routing, or lawful intercept functions.

18. The system of claim 13, where the network device uses a content addressable memory (CAM) to monitor the bearer data when the subsequent datagram includes bearer data.

19. The system of claim 13, where the processor is further to:
monitor one of the bearer data or the signaling data to facilitate one or more of quality-of-service (QoS), traffic engineering, policy routing, or lawful intercept functions.

20. A method for facilitating a communication session over a network via a network device, the method comprising:
intercepting, by the network device, a signaling datagram from a source device that includes a source identifier, where the network device comprises at least one of a Session Initiation Protocol (SIP) application layer gateway (ALG), a SIP proxy, or a SIP back-to-back user agent (B2BUA);
generating, by the network device, a response datagram for instructing the source device to send a subsequent datagram to the network device;
forwarding, by the network device, the signaling datagram to a SIP server, where the SIP server associates the source identifier with the network device that acts on behalf of the source device, and the SIP server connects a destination device with the source device to establish a communication session over the network;
receiving, by the network device, the subsequent datagram from the source device; and
making by the network device, the subsequent datagram available to the destination device via the network.

21. The method of claim 20, where the signaling datagram comprises a Session Initiation Protocol (SIP) REGISTER request and the response datagram comprises a SIP RE-DIRECT instruction.

22. The method of claim 20, where the communication session is established using a Session Initiation Protocol (SIP).

23. The method of claim 20, further comprising:
performing at least one of a quality-of-service (QoS) function, a traffic engineering function, a policy routing function, or a lawful intercept function on the subsequent datagram.

24. The method of claim 20, where the signaling datagram is received by a transparent proxy.

25. The method of claim 20, further comprising:
operating on at least one of a header portion or a payload portion associated with the subsequent datagram prior to making the subsequent datagram available to the network.

26. The method of claim 20, further comprising:
applying an application classifier, in conjunction with making the subsequent datagram available to the destination device, to implement a rule set for making decisions about signaling traffic traversing the network device.

27. A network device operating in a network to provide a communication session, the network device comprising at least one of a Session Initiation Protocol (SIP) application layer gateway (ALG), a SIP proxy, or a SIP back-to-back user agent (B2BUA), the network device further comprising:
a processor to:
intercept a signaling datagram associated with a source device, the signaling datagram including a destination address and signaling information;
receive the intercepted signaling datagram,
forward the signaling information to a destination device as a first outgoing datagram;
receive a reply from the destination device, the reply acknowledging receipt of the signaling information; and
substitute a source address associated with the destination device into a second outgoing datagram so that the source device interprets the second outgoing datagram as originating from the destination device instead of from the network device.

* * * * *

UNITED STATES PATENT AND TRADEMARK OFFICE
CERTIFICATE OF CORRECTION

| | | |
|---|---|---|
| PATENT NO. | : 8,098,671 B1 | Page 1 of 1 |
| APPLICATION NO. | : 11/207934 | |
| DATED | : January 17, 2012 | |
| INVENTOR(S) | : Denis DeRuijter et al. | |

It is certified that error appears in the above-identified patent and that said Letters Patent is hereby corrected as shown below:

IN THE CLAIMS:
Column 16, Claim 20, line 47, insert --,-- after "making".

Signed and Sealed this
First Day of May, 2012

David J. Kappos
*Director of the United States Patent and Trademark Office*